(12) United States Patent
Sanchez et al.

(10) Patent No.: US 6,378,773 B1
(45) Date of Patent: Apr. 30, 2002

(54) SHIELDED ROLLER FOR REDUCING MAGNETIC INTERFERENCES IN A MICR SYSTEM READ HEAD

(75) Inventors: Jesse Sanchez, Arlington; Evan Samuel, Fort Worth, both of TX (US)

(73) Assignee: BancTec, Inc., Irving, TX (US)

( * ) Notice: Subject to any disclaimer, the term of this patent is extended or adjusted under 35 U.S.C. 154(b) by 0 days.

(21) Appl. No.: 09/576,910

(22) Filed: May 23, 2000

(51) Int. Cl.⁷ .................................................. G06K 7/08
(52) U.S. Cl. ...................................... 235/449; 235/486
(58) Field of Search ................................... 235/375, 436, 235/449, 441, 475–487, 493; 400/237, 225, 238, 239, 240

(56) References Cited

U.S. PATENT DOCUMENTS

| | | | |
|---|---|---|---|
| 3,801,804 A | * 4/1974 | Von Glahn et al. | 235/61.11 |
| 3,844,553 A | * 10/1974 | Overfield et al. | 271/179 |
| 4,087,789 A | 5/1978 | Beery | 340/146.3 |
| 4,212,041 A | 7/1980 | Lazzari et al. | 360/113 |
| 4,797,016 A | * 1/1989 | Lahr | 400/237 |
| 4,832,328 A | * 5/1989 | Graham | 271/35 |
| 5,065,998 A | * 11/1991 | Salomon | 271/251 |
| 5,129,751 A | * 7/1992 | Piller et al. | 400/692 |
| 5,155,643 A | 10/1992 | Jones, Jr. et al. | 360/113 |
| 5,530,776 A | 6/1996 | Bov, Jr. et al. | 382/320 |
| 5,598,279 A | * 1/1997 | Ishii et al. | 358/402 |
| 5,634,729 A | 6/1997 | Kinney et al. | 400/73 |
| 5,925,866 A | 7/1999 | Yeckley | 235/449 |
| 6,311,819 B1 | * 11/2001 | Stromme et al. | 194/207 |

* cited by examiner

*Primary Examiner*—Thien M. Le
(74) *Attorney, Agent, or Firm*—Locke Liddell & Sapp LLP

(57) ABSTRACT

A document transport system wherein documents containing magnetized encoded indicia are to be read by a magnetic ink character recognition read head as the documents are transported by rollers along a document transport path includes a base plate disposed along the document transport path. A shaft is attached to the base plate and disposed generally perpendicular to the base plate. A hub member having a top surface, a bottom surface, an outer peripheral surface and a centrally disposed aperture receives the shaft. The hub member is supported on the base plate for rotation about the shaft. The hub member includes a slot spaced apart from and disposed between the centrally disposed aperture and the outer peripheral surface. A magnetic shield is attached to the base plate and is disposed within the hub member slot.

15 Claims, 2 Drawing Sheets

SHIELDED ROLLER FOR REDUCING MAGNETIC INTERFERENCES IN A MICR SYSTEM READ HEAD

TECHNICAL FIELD OF THE INVENTION

The present invention relates to document handling system, and more particularly to a roller for reducing magnetic interference in a MICR read head.

BACKGROUND OF THE INVENTION

Magnetic ink characters are characters or symbols which are printed on a document using magnetic ink. Documents containing magnetic ink characters are typically bank checks, deposit slips and other documents. Magnetic ink characters may be printed in a standardized format or font such as, for example, E13B or CMC7, and are typically located near an edge of a document.

Magnetic ink characters are read by a magnetic head as the head moves across the document or the document is caused to move past the head. The magnetic signals detected by the head are converted to electrical signals which are processed by a magnetic ink character recognition (MICR) system.

Document processing systems with a MICR capability can be affected by magnetic interference which slows or prevents magnetic ink characters from being read. Magnetic sources, such as, for example, electromagnetic coils, generate magnetic fields resulting in interference relative to the magnetic information stored in the magnetic ink portion of a document. These interference signals may arise from nearby equipment such as displays, scanners, the MICR processing system itself, or motors and other electromechanical devices that may be used to move documents along a transport path. Other devices located along the transport path, such as, for example, rollers including bearings, generate magnetic field interference which causes poor signal to noise ratio in the MICR read head. This problem is increased when roller bearings fail which causes high frequency noise in the MICR read head.

A need has thus arisen for a roller for use in a document transport system which reduces magnetic interference for proper operation of a magnetic read head.

SUMMARY OF THE INVENTION

In accordance with the present invention, a document transport system is provided wherein documents containing magnetized encoded indicia are to read by a magnetic ink character recognition read head as the documents are transported by rollers along a document transport path. The system includes a base plate disposed along the document transport path. A shaft is attached to the base plate and disposed generally perpendicular to the base plate. A hub member having a top surface, a bottom surface, an outer peripheral surface and a centrally disposed aperture receives the shaft. The hub member is supported on the base plate for rotation about the shaft. The hub member includes a slot spaced apart from and disposed between the centrally disposed aperture and the outer peripheral surface. A magnetic shield is attached to the base plate and is disposed within the hub member slot.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
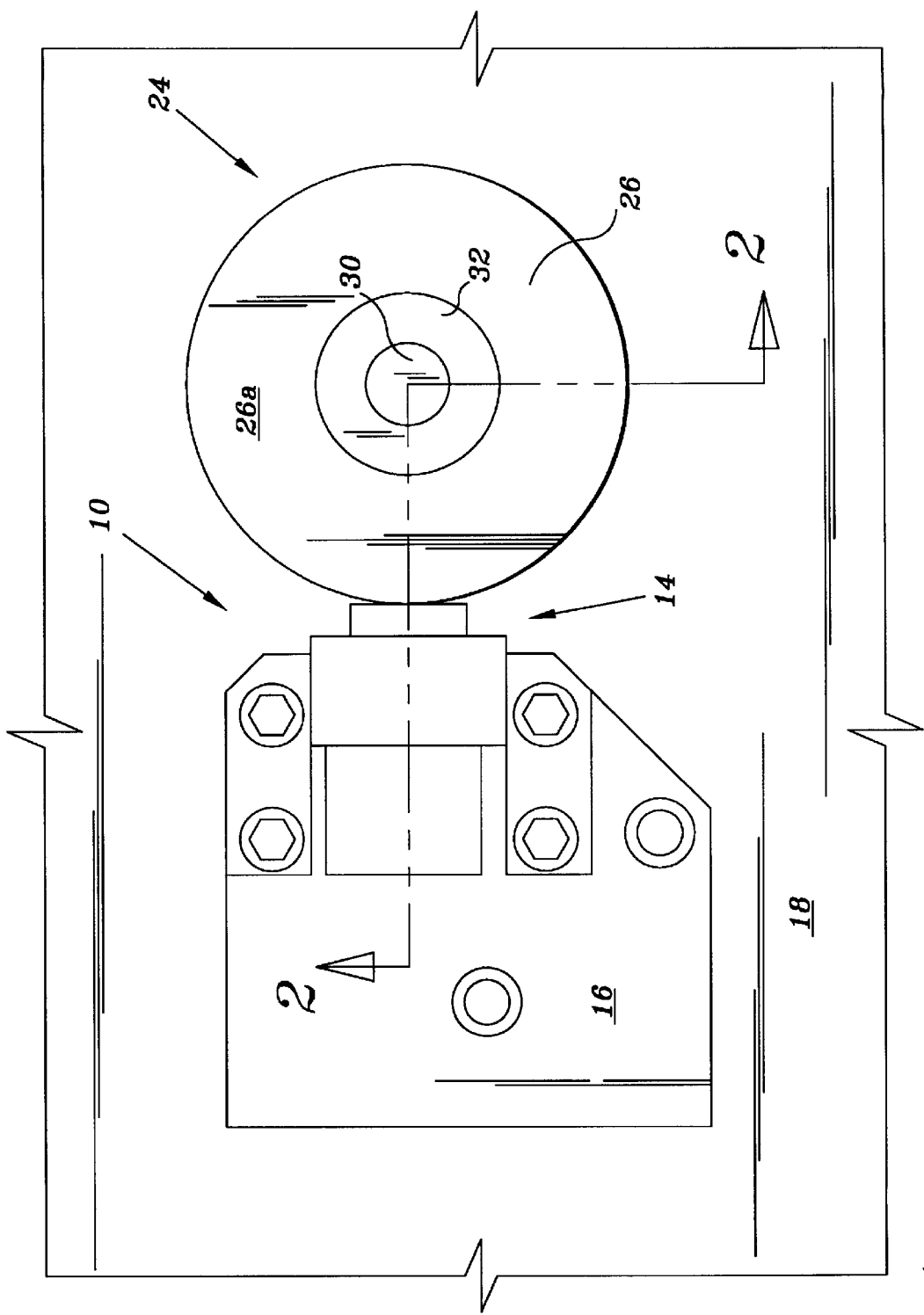
FIG. 1 is a top plan view of a portion of a document transport system illustrating a MICR read head and the present roller.
Figure 2:
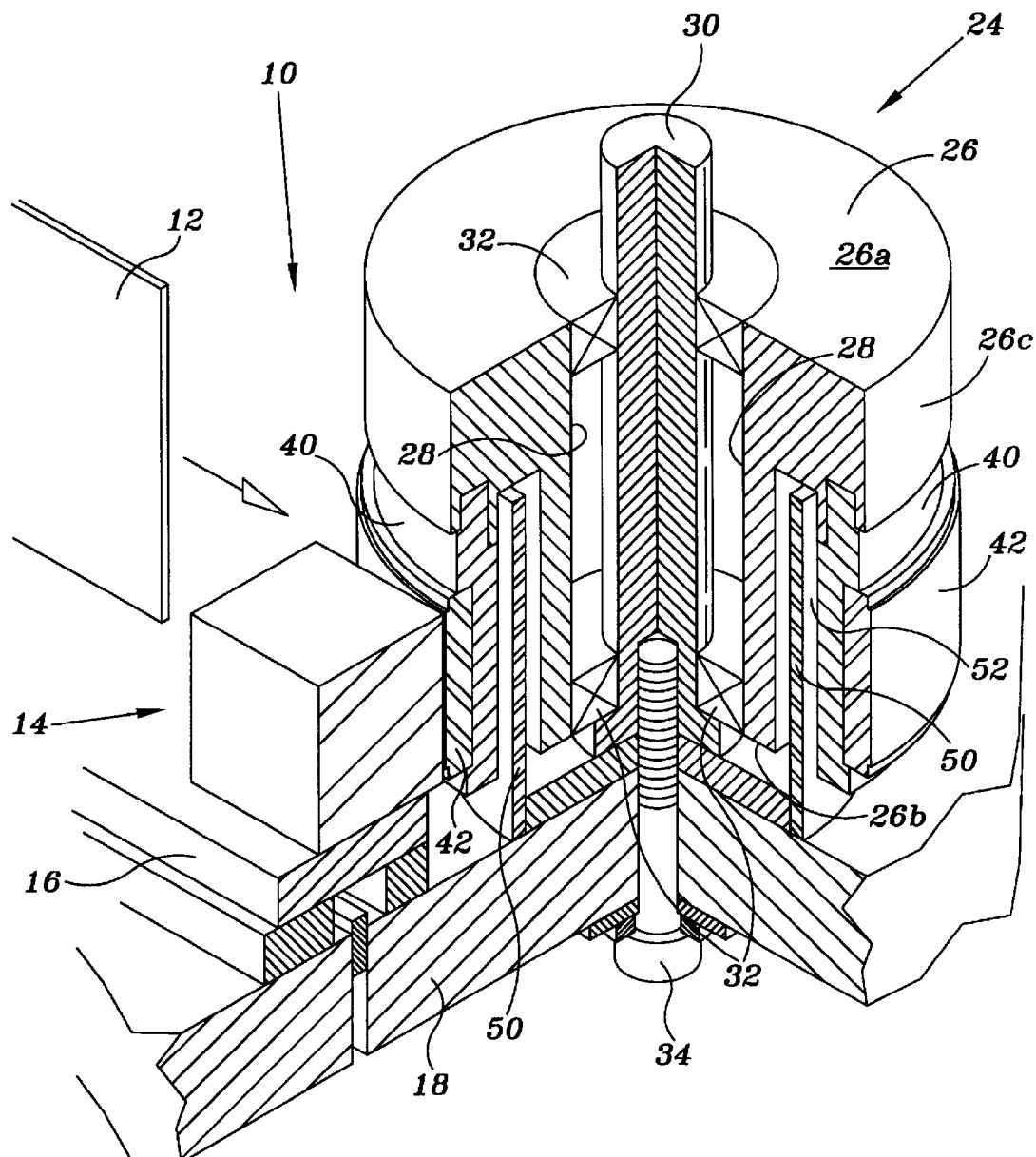
FIG. 2 is a sectional view taken generally along sectional lines 2—2 of FIG. 1.

Referring simultaneously to FIGS. 1 and 2, a document transport system, generally identified by the numeral 10, is illustrated for transporting a document 12 past a MICR read head, generally identified by the numeral 14. Document 12 may comprise, for example, a bank check including magnetic ink characters. The operation of MICR read head is well known to those skilled in the art, and various read heads may be utilized with the present transport system 10. Read head 14 is mounted to transport system 10 utilizing a bracket 16 which is mounted to a base plate 18.

Transport system 10 includes a roller, generally identified by the numeral 24. Roller 24 includes a hub member 26. Hub member 26 includes a top surface 26a, a bottom surface 26b, and a peripheral surface 26c. Extending from top surface 26a to bottom surface 26b of hub member 26 is a centrally disposed aperture 28. Disposed within centrally disposed aperture 28 is a shaft 30 which is mounted within aperture 28 utilizing bearings 32. Shaft 30 is mounted to base plate 18 of transport system 10 utilizing a fastener 34 and is disposed generally perpendicular to base plate 18. It therefore can be seen that hub member 26 is free to rotate about shaft 30 for engaging and transporting documents 12 past read head 14. Hub member 26 may be driven by a belt (not shown) which engages peripheral surface 26c. Hub member 26 may be fabricated from aluminum material.

Extending from hub member 26 is an insert 40 which is attached to a resilient tire 42. Tire 42 engages document 12 and maintains document 12 in contact with read head 14. Insert 40 may be fabricated from plastic, such as, for example, non-conductive plastic material, a non-conductive metal composite, or non-magnetic inductor. Insert 40 functions to absorb magnetic energy which is generated as a result of rotation of roller 24. Tire 42 may comprise, for example, foam material.

An important aspect of the present invention is the use of a shield 50. Shield 50 is mounted to base plate 18 and is disposed within a cylindrical slot 52 which extends within hub member 26 from bottom surface 26b to a location below top surface 26a and which is between hub member 26 and insert 40. Shield 50 comprises, for example, a high permeability metal cylindrical shield, and may include, for example, magnetic shielding material having an unorientated 80% nickel-iron-molybdenum alloy which offers extremely high initial permeability and maximum permeability with minimum hysteresis loss. Such a material is manufactured and sold by the MμShield Company, Inc. of Goffstown, N.H. Shield 50 is stationery since shield 50 is mounted to base plate 18 such that hub member 26 rotates about shield 50. Shield 50 functions to reduce magnetic interference caused by roller 24. Shield 50 may have a thickness of, for example, 0.062 inches and protects read head 14 from magnetic lines of force generated by bearing 32 and the rotating of member 26.

It therefore can be seen that the present roller offers protection from magnetic field interference around a MICR read head. The present roller may be disposed at any location along a document transport path in a document transport system for minimizing the effect of magnetic field interference.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A document transport system wherein documents containing magnetized encoded indicia are to be read by a magnetic ink character recognition read head as the documents are transported by rollers along a document transport path, the system comprising;

a base plate disposed along the document transport path;

a shaft attached to said base plate and disposed generally perpendicular to said base plate;

a hub having a top surface, a bottom surface, and an outer peripheral surface, said hub member further having a centrally disposed aperture extending between said top surface and said bottom surface for receiving said shaft, such that said hub member is supported by said base plate for rotation about said shaft;

said hub member having a slot spaced apart from and disposed between said centrally disposed aperture and said outer peripheral surface; and magnetic shielding material attached to said base plate and disposed within said hub member slot.

2. The system of claim 1 and further including:

a resilient ring fixed to said hub member outer peripheral surface for contacting documents transported along the document transport path.

3. The system of claim 1 and further including:

a ring of static dissipating plastic material fixed to said hub member outer peripheral surface.

4. The system of claim 1 and further including:

a ring of static dissipating material fixed to said hub member outer peripheral surface; and a resilient ring attached to said ring of static dissipating material for contacting documents transported along the document path.

5. The system of claim 1 wherein said hub member includes aluminum and said magnetic shielding material includes nickel-iron-molybdenum alloy.

6. A document transport system wherein documents containing magnetized encoded indicia are to be read by a magnetic ink character recognition read head as the documents are transported by rollers along a document transport path, the system comprising;

a base plate disposed along the document transport path;

a shaft attached to said base plate and disposed generally perpendicular to said base plate;

a hub having a top surface, a bottom surface, and an outer peripheral surface, said hub member further having a centrally disposed aperture extending between said top surface and said bottom surface for receiving said shaft, such that said hub member is supported by said base plate for rotation about said shaft;

said hub member having a cylindrical slot spaced apart from and disposed between said centrally disposed aperture and said outer peripheral surface; and magnetic shielding material attached to said base plate and disposed within said hub member slot.

7. The system of claim 6 and further including:

a resilient ring attached to said hub member outer peripheral surface for contacting documents transported along the document transport path.

8. The system of claim 6 and further including:

a ring of static dissipating plastic material fixed to said hub member outer peripheral surface.

9. The system of claim 6 and further including:

a ring of static dissipating plastic material fixed to said hub member outer peripheral surface; and a resilient ring fixed to said ring of static dissipating plastic material for contacting documents transported along the document path.

10. The system of claim 6 wherein said hub member includes aluminum and said magnetic shielding material includes nickel-iron-molybdenum alloy.

11. A document transport system wherein documents containing magnetized encoded indicia are to be read by a magnetic ink character recognition read head as the documents are transported by rollers along a document transport path, the system comprising;

a base plate disposed along the document transport path;

a shaft attached to said base plate and disposed generally perpendicular to said base plate;

a hub having a top surface, a bottom surface, and an outer peripheral surface, said hub member further having a centrally disposed aperture extending between said top surface and said bottom surface for receiving said shaft, such that said hub member is supported by said base plate for rotation about said shaft;

said hub member having a cylindrical slot spaced apart from and disposed between said centrally disposed aperture and said outer peripheral surface; and magnetic shielding material having a cylindrical shape and attached to said base plate and disposed within said hub member slot such that said hub member rotates around said magnetic shielding material.

12. The system of claim 11 and further including:

a resilient ring fixed to said hub member outer peripheral surface for contacting documents transported along the document transport path.

13. The system of claim 11 and further including:

a ring of static dissipating plastic material fixed to said hub member outer peripheral surface.

14. The system of claim 11 and further including:

a ring of static dissipating plastic material fixed to said hub member outer peripheral surface; and a resilient ring attached to said ring of static dissipating plastic material for contacting documents transported along the document path.

15. The system of claim 14 wherein said hub member includes aluminum and said magnetic shielding material includes nickel-iron-molybdenum alloy.

* * * * *